(No Model.)
E. L. BABCOCK.
FRICTION CLUTCH.
No. 429,298. Patented June 3, 1890.
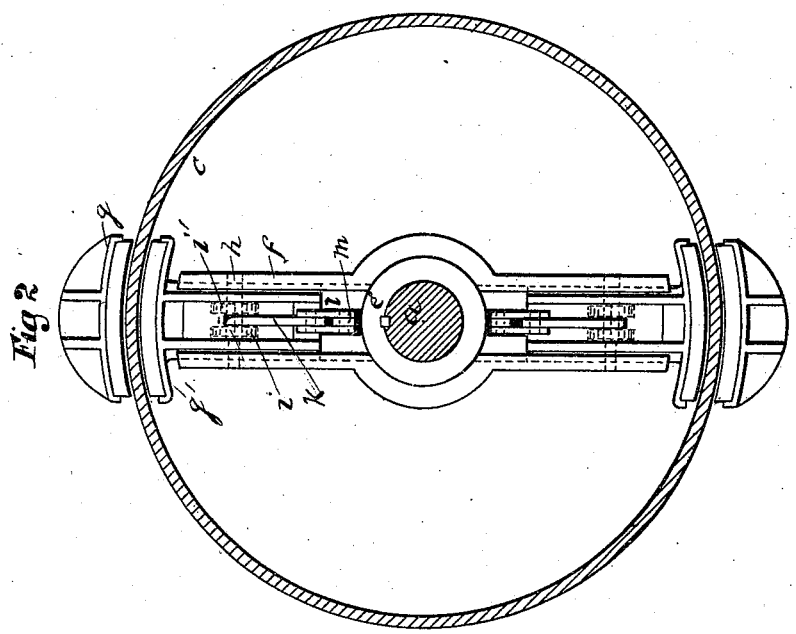
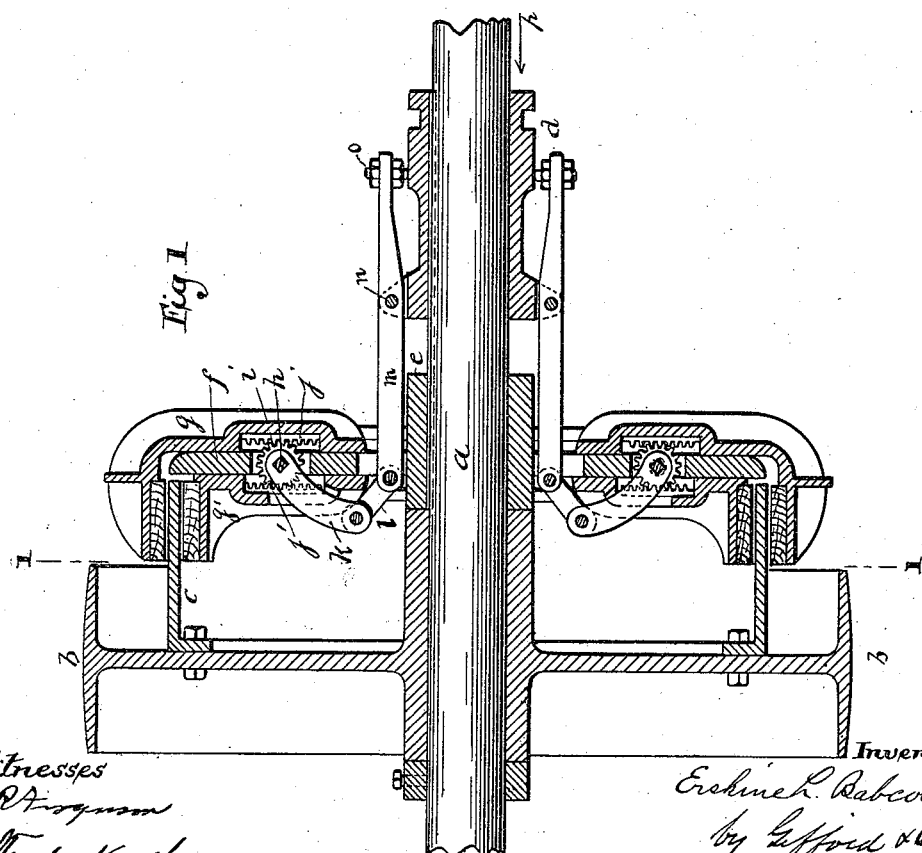
Witnesses
Inventor
Erskine L. Babcock
by Gifford & Brown
Attys.

UNITED STATES PATENT OFFICE.

ERSKINE L. BABCOCK, OF CUYAHOGA FALLS, OHIO.

FRICTION-CLUTCH.

SPECIFICATION forming part of Letters Patent No. 429,298, dated June 3, 1890.

Application filed April 11, 1889. Renewed December 9, 1889. Serial No. 333,018. (No model.)

*To all whom it may concern:*

Be it known that I, ERSKINE L. BABCOCK, of Cuyahoga Falls, Ohio, have invented a new and useful Improvement in Friction-Clutches, of which the following is a specification.

My invention relates to that class of clutches in which jaws moving inversely and radially upon a clutch-arm fast to the shaft grasp a flange running cylindrically round the shaft. Examples of this class are shown in Letters Patent of the United States No. 383,104, dated May 22, 1888; also, No. 367,856, dated August 9, 1887; also, No. 308,872, dated December 9, 1884.

My invention consists in the mechanism by which the motion of the shifter-sleeve is transmitted to the jaws to operate the clutch, said mechanism consisting, essentially, of a pinion pivoted to the clutch-arm acting upon a rack connected with each of the jaws, and mechanism connecting the shifter-sleeve with the pinion and adapted to oscillate the latter in response to the reciprocation of the former. One form of mechanism which may be adopted for connecting the shifter-sleeve with the pinion is shown in the drawings; but other forms might be employed to more or less advantage without departing from the principle of my invention.

In the drawings, Figure 1 is a longitudinal section through the axis of the pulley and clutch. Fig. 2 is a transverse section through the line 1 1 of Fig. 1.

Duplicate clutch mechanisms are shown diametrically opposite each other on both sides of the shaft, so that the centrifugal force of one counterbalances that of the other. The number of pairs of these clutch mechanisms may be increased to any extent which the circumference of the pulley-flange will permit of, all being operated from the same shifting lever.

$a$ is the shaft.

$b$ is the pulley, which is loose upon the shaft.

$c$ is the pulley-flange, cylindrical to the shaft upon which the clutch-jaws operate.

$d$ is the sleeve, turning with the shaft and sliding longitudinally thereon, which is operated by the shifting lever.

$e$ is a hub keyed fast to the shaft, from which extend radial clutch-arms $f$.

$g$ and $g'$ are jaws of substantially the form shown, provided with friction-surfaces, preferably of wood, to engage the pulley-flange inside and outside. These jaws are mounted in guideways upon opposite sides of the clutch-arm $f$, so as to slide radially thereon, being held upon said guideways preferably by a tongue-and-groove connection. An opening is cut through the clutch-arm $f$, which is crossed by a shaft $h$, having a bearing at each end in the clutch-arm on both sides of the opening. Fixed upon this shaft is a pinion $i$, located within the opening cut through the clutch-arm, and projecting far enough from the plane of each side of the clutch-arm to engage on the one side with the rack $j$, connected with the jaw $g$, and on the other side with the rack $j'$, connected with the jaw $g'$, as clearly shown in Fig. 1. Now, it is obvious that when this pinion is moved to the right the two jaws will be slid inversely in the guideways upon the clutch-arm, so as to grip the pulley-flange with a vise-like grip between their wooden friction-surfaces, and when the pinion is moved to the left the two jaws move in the opposite direction, so as to release the pulley-flange. It will also be observed that when the shaft and clutches are revolving whatever centrifugal force may be created by the inner jaws, tending to close them upon the flange, will to a greater or less extent, depending upon the comparative weight of the jaws, be counterbalanced by the centrifugal force of the outer jaws tending in the opposite direction.

It now remains only to provide mechanism which may be used for actuating the pinion $i$ by the motion of the shifter-sleeve $d$. Fixed to the pinion $i$ or the shaft $h$, upon which it is mounted, is an arm $k$, which extends inwardly toward the shaft and is connected by a link $l$ with the end of a projection $m$ from the sleeve $d$. Some means of adjustment should be provided between the pinion $i$ and the sleeve $d$, and for this purpose the projection $m$ may be made in the form of a lever, pivoted to the sleeve at $n$, and having its rear end connected to the sleeve $d$ by a screw $o$, whereby its angle of inclination may be changed and fixed. Preferably the pinion $i$ will be divided into two parts, as indicated in dotted lines at $i$ and $i'$ of Fig. 2, the said two parts being located on the shaft $h$, one upon each side of the arm k. Now, it is plain that to close the clutch it is only necessary to move the sleeve d in the direction indicated by the arrow p, Fig. 1, until it comes in contact with the hub e. This will swing the lower end of the link l forward and force the upper end thereof outward from the shaft, so as to turn the pinion i to the right and close the jaws upon the flange. The lower end of the link l will be moved slightly beyond the point at which the link stands radial to the shaft, so that when the clutch is closed the position of this link will act as a lock to prevent the clutch from being jarred open. If it is desired to take up the wear of the jaws or the flange at any time, this may be accomplished by tightening the nut upon the set-screw o, so as to elevate the forward end of projection m, and thus bring the jaws nearer together when the clutch is closed.

I claim—

1. In combination, the cylindrical friction-flange, the inversely-moving jaws, the clutch-arm upon which said jaws move, the pinion pivoted to the clutch-arm, a rack connected with each jaw and engaging said pinion, a shifter-sleeve upon the shaft, and mechanism by which said pinion is revolved, substantially as described.

2. In combination, the friction-flange cylindrical to the shaft, the inversely-moving jaws, the clutch-arm upon which said jaws move, a pinion pivoted to said clutch-arm, a rack connected with each jaw and engaging said pinion, an arm fixed to said pinion, and a link connecting said arm with a projection from the shifter-sleeve, substantially as described.

ERSKINE L. BABCOCK.

Witnesses:
ORLANDO WILCOX,
H. J. STAMBAUGH.